United States Patent [19]

Tews et al.

[11] Patent Number: 5,038,605
[45] Date of Patent: Aug. 13, 1991

[54] RAILCAR BRAKE TESTER

[75] Inventors: Bernard L. Tews, Lansing, Ill.; Phillip G. Przybylinski, Schererville, Ind.

[73] Assignee: Trinity Industries, Inc., Dallas, Tex.

[21] Appl. No.: 568,207

[22] Filed: Aug. 16, 1990

[51] Int. Cl.⁵ ............................................. G01L 5/28
[52] U.S. Cl. .................................... 73/129; 73/862.54
[58] Field of Search ............... 73/129, 862.65, 862.48, 73/132, 862.57, 862.56, 862.54; 188/1.11, 34

[56] References Cited

U.S. PATENT DOCUMENTS

| | | | |
|---|---|---|---|
| 2,414,161 | 1/1947 | Moore | 73/862.65 X |
| 3,782,185 | 1/1974 | Hassenauer et al. | 73/121 |
| 4,016,755 | 4/1977 | Anderberg et al. | 73/121 |
| 4,346,790 | 8/1982 | Morrison et al. | 188/34 X |

FOREIGN PATENT DOCUMENTS 244107 3/1987 German Democratic Rep. .................................... 188/1.11

OTHER PUBLICATIONS

The JIM SHOE Brake Force Measurement System by Inter Swiss Ltd. 2/88, pp. 1 and 2 and pp. 1 through 8.

Primary Examiner—Jerry W. Myracle
Attorney, Agent, or Firm—Myers & Associates, Ltd.

[57] ABSTRACT

A brake tester for measuring static force levels of the brake shoes and hand brake, and the pressure level of the brake cylinder of a railcar. Brake shoe load cells are used to measure brake shoe forces by creating point contact with the railcar wheel and undergoing deflection during application of a brake force. A clevis load cell measures hand brake force by simulating the clevis and produces an output from a plurality of strain gauges.

22 Claims, 3 Drawing Sheets

RAILCAR BRAKE TESTER

BACKGROUND OF THE INVENTION

1. Field of the Invention

This invention relates to brake testing systems and more particularly, to an system for measuring brake shoe forces applied in the brake system of a railcar.

2. Description of the Prior Art

A railcar typically is equipped with a air brake system for operating brake shoe assemblies that apply brake forces to the wheels. The pressurized brake system is supplemented by a hand brake arrangement for applying a manual braking force. In order to maintain consistent and proper functioning of the railcar braking system, it is necessary to test such parameters as brake shoe forces and hand brake force during assembly or conversion of a railcar. Present requirements establishing minimum permissible brake force levels attempt to insure proper braking during operation of the railcar. The American Association of Railroads (AAR) have required that dynamometers for testing brake shoe systems meet specific standards for accuracy. Several static measuring systems have been developed in the past to quantitatively measure the forces exerted by the brake shoes and hand brake.

Existing brake testers employ several techniques of force measurement that suffer from a variety of shortcomings. For example, many brake testing devices are relatively inaccurate, bulky, and incapable of being easily transported from place to place as is advantageous in use. Other brake force testers do not permit the convenient simultaneous measurement of multiple brake shoes, hand brake force, and cylinder pressure. One technique of testing brakes employs force transducers, having strain gauges and the like, that are affixed to selected brake components of a railcar for making measurements. Some of the testing devices simulate brake shoes or other components so that a reading of force is attainable. Prior designs of brake shoe transducers are relatively expensive to fabricate and do not attain optimim results in use. It is therefore desirable to provide an easily transportable brake force tester attaining concurrent measurement of multiple brake forces with enhanced accuracy.

SUMMARY OF THE INVENTION

It is an objective of the present invention to provide an improved brake tester for railcars. The brake tester herein disclosed is capable of the measurement of a plurality of brake shoe forces along with a detection of hand brake force. The system of the application is further provided with means to measure the air pressure in the brake cylinder for a comprehensive evaluation of the condition of the brake system in the railcar being tested.

Brake shoe force in the invention is detected by a load cell having a unique configuration for precise multiple contact with the wheel. Multiple contact is provided by means which maintain discrete point contact regardless of variations in railcar wheel diameter. Strain gauges measure the compression and tension strains or stresses occuring as a result of the loading on the brake shoe load cell during application of a brake force. The degree of deflection of the load cell generates an electrical signal from which the force applied between the brake shoe and railcar wheel is quantitatively derived. The brake shoe load cell of the application possesses an improved configuration formed from flat sections that are economical to fabricate and provide an accurate output. The load cell is used in place of the railcar brake shoe during testing and measures the static force level applied between the brake shoe and wheel.

The brake tester of the invention also includes a clevis load cell replacing the hand brake clevis for further measuring the force imposed by the hand brake. The clevis force transducer simulates the hand brake clevis and measures the force level applied by the hand brake by means of strain gauges, uniquely responsive to tensile loads on the load cell. The design of the clevis load cell of the invention corresponds essentially to the configuration of the normal railcar clevis for accurate results. In use, the brake tester herein disclosed attains accurate readings of the force levels in the railcar brake system for determining if acceptable force levels are attained. The brake tester of the invention is also easy to use and calibrate, relatively economical to manufacture considering its accuracy, and can be transported from place to place with ease.

DESCRIPTION OF THE PREFERRED EMBODIMENT

Figure 1:
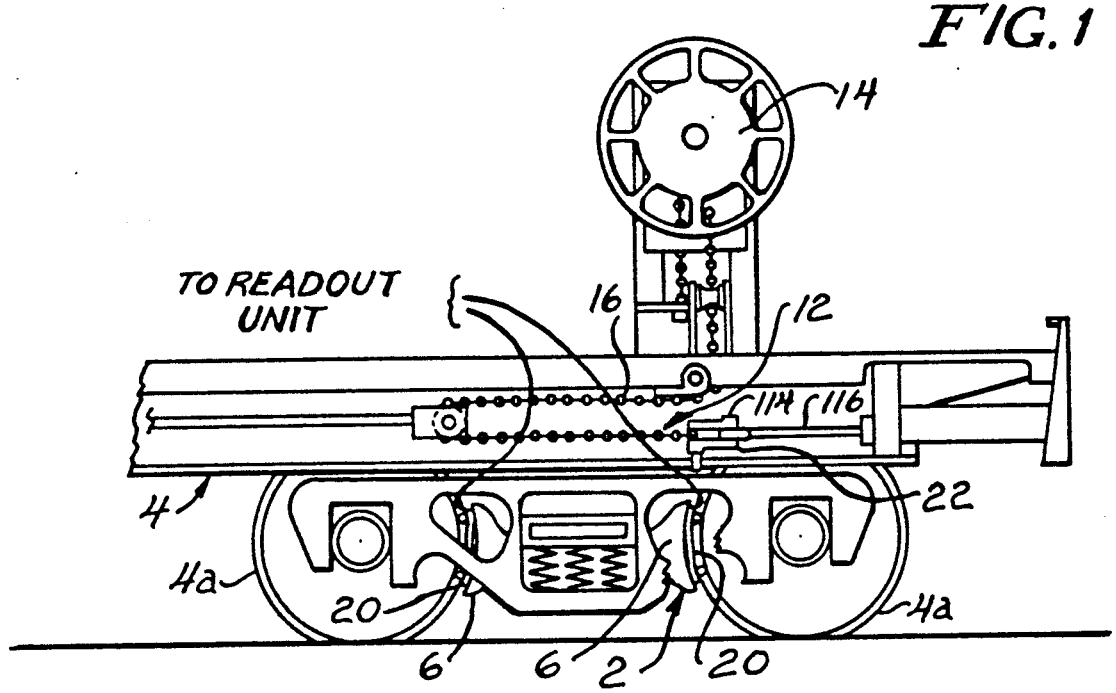
FIG. 1 is a partial side elevational view of the brake tester of the invention, with parts broken away, shown mounted in operative relationship on the brake system of a railcar.
Figure 2:
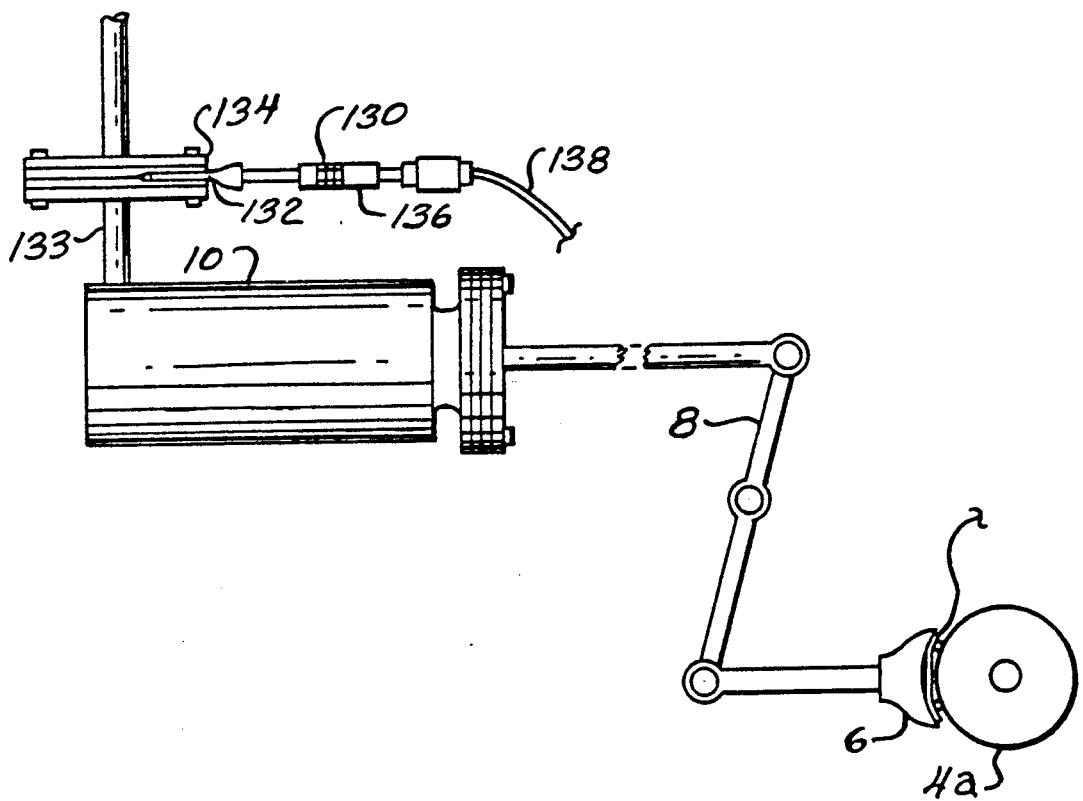
FIG. 2 is a partial side elevational view of the pressure transducer of the brake tester of the invention shown in operative connection with the air line input to the brake cylinder of a railcar.

Referring to FIG. 1, there is illustrated the brake tester of the invention, generally designated by reference numeral 2, for testing the brake system of railcars. The brake tester 2 is capable of the multiple functions of measuring a plurality of the static forces applied by brake shoes against railcar wheels, the force of the hand brake, and the pressure in the brake cylinder. As shown in FIGS. 2, the brake system of railcar 4 includes a brake head 6 on which a conventional brake shoe (not shown) is normally mounted to contact wheel 4a during braking. The brake rigging linkage 8 applies force from brake cylinder 10 to the brake head 6 to urge the brake shoe against wheel 4a. The brake system 2 further includes a hand brake system 12 that is operable from above through use of brake wheel 14, as seen in FIG. 1. The brake wheel 14 applies a manual braking force through chain 16 to a conventional clevis (not shown) in a manner well known in the art.

The brake tester 2 of the invention employs one or more brake shoe load cells 20, such as, for example, four separate brake shoe cells of which two are illustrated in FIG. 1. Each brake shoe load cell 20 temporarily simulates a normal railcar brake shoe and measures the static brake shoe force at a respective wheel. By using a plurality of brake shoe force cells 20, a plurality of measurements of brake shoe forces can be made. Brake tester 2 further is provided with clevis load cell 22 adapted for selective attachment to the end of the hand brake chain 16 in place of the conventional clevis (not shown) of the hand brake system. The original brake shoes and clevis of the railcar are installed in the brake system after the desired force measurments have been performed, and the brake shoe load cells 20 and clevis load cell 22 have been removed.

Figure 3:
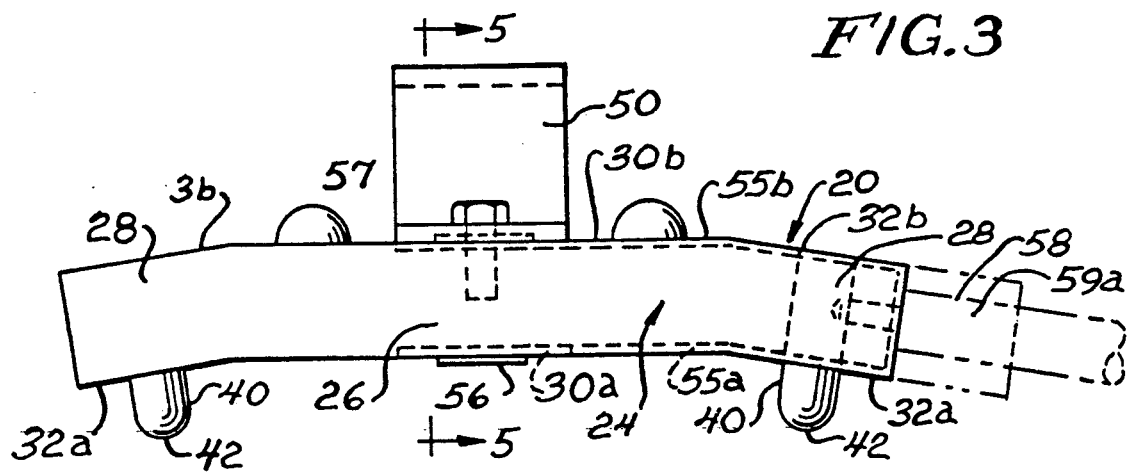
FIG. 3 is a side elevational view of the brake shoe load cell of the brake tester of FIG. 1 for measuring brake shoe force.
Figure 4:
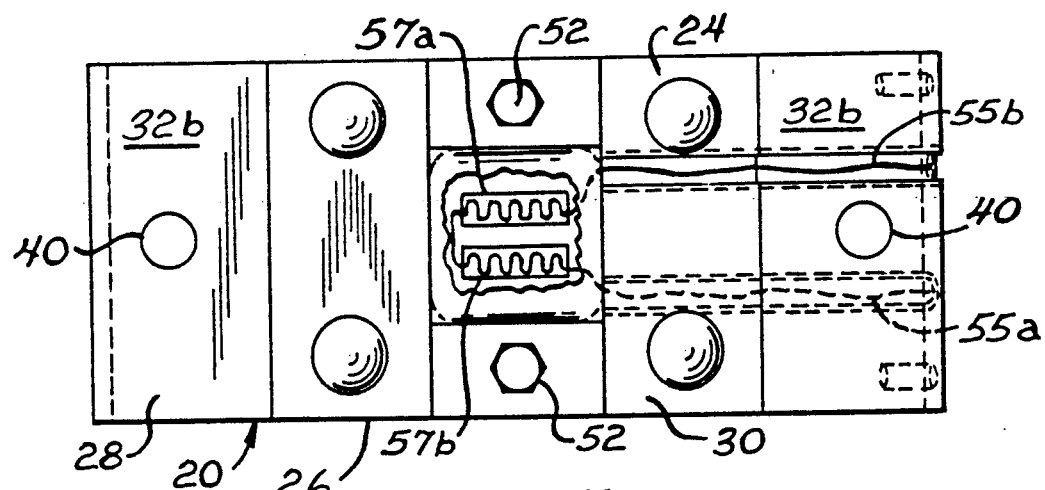
FIG. 4 is a front elevational view of the brake shoe load cell of FIG. 3.
Figure 5:
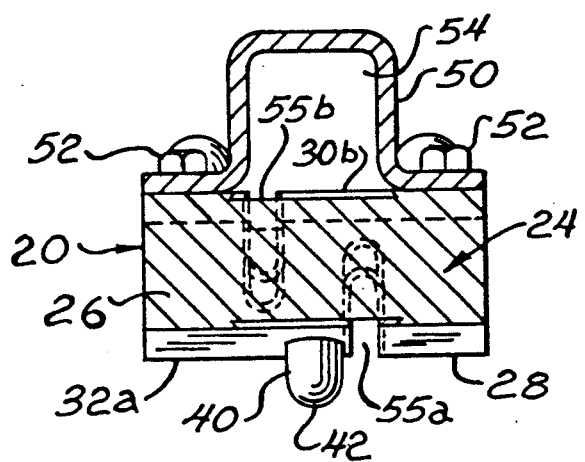
FIG. 5 is an end sectional view of the load cell of FIG. 3 taken along lines 5—5 of FIG. 3.

Referring to FIG. 3 to 5, details of one of brake shoe load cells 20 are illustrated. Brake shoe load cell 20 includes a cell body 24 having a central portion 26 and a pair of end portions 28, each of which portions has a rectangular cross-sectional configuration. The cell body 24 may be fabricated from any suitable metal material, such as, for example, lightweight aluminum and the like. The central portion 26 of cell body 24 provides a pair of opposed flat parallel surfaces 30a, 30b. The end portions 28 of cell body 24 also each has opposite flat surfaces 32a, 32b. As seen in FIG. 3, the planes of surfaces 32a, 32b are angularly oriented with respect to the planes of surfaces 30a, 30b, such that cell body 24 is symmetrically formed with two slanted end portions 28. The surfaces 30a, 32a of brake shoe load cell 20 are intended to confront a respective vehicle wheel 4a during testing. A pair of projections or feet 40 respectively extend from surfaces 32a of end portions 28. The free ends 42 of both feet 40 are rounded with a constant radius and contact the vehicle wheel during application of a brake shoe force. The use of rounded ends 42 insures generally point contact with the wheel 4a to provide accurate force detection regardless of encountered variations in the diameter of the wheel.

A U-shaped retainer 50 is affixed by threaded members 52 to intermediate portion 26 and is disposed transversely across the brake shoe load cell 20. The retainer 50 provides an opening 54 in which a pin (not shown) is inserted to retain the brake cell load cell 20 on brake head 6. As seen in FIGS. 3–5, a continuous open dovetail groove 55a is respectively cut in outer surfaces 30a of central portion 26 and surface 32a of one of the end portions 28 of cell body 24. A dovetail groove 55b is similarly provided on the opposite side of cell body 24 on outer surfaces 30b and 32b. Both grooves provide recessed passageways for electrical leads extending from conventional strain gauges 56 and 57 suitably bonded by a known technique to the outer opposed surfaces 30a and 30b of central portion 26 of brake shoe load cell 20. During application of a braking force, brake shoe load cell 20 undergoes structural deflection, such that strain gauges 56 are subjected to tension forces and strain gauges 57 are subjected to compression.

As best seen in FIG. 3, the strain gauge 56 includes a pair of parallel strain gauge elements 56a and 56b bonded to surface 30a, while strain gauge 57 includes bonded strain gauge elements 57a and 57b. The strain gauge elements 56a and 56b are wired to form opposite sides of a Wheatstone bridge (not shown) to measure tension. The strain gauge elements 57a and 57b form the remaining two opposite sides of the Wheatstone bridge in connection with strain gauge elements 56a and 56b. The output of the bridge representing the deflection of brake shoe load cell 20 and hence brake force is directed to a pin and socket arrangement 58 of conventional design by leads 59 extending through grooves 55a and 55b. A cable 59a is connected to the pin and socket 58 during measuring to direct the output of the bridge to an electrical circuit to be described.

Figure 6:
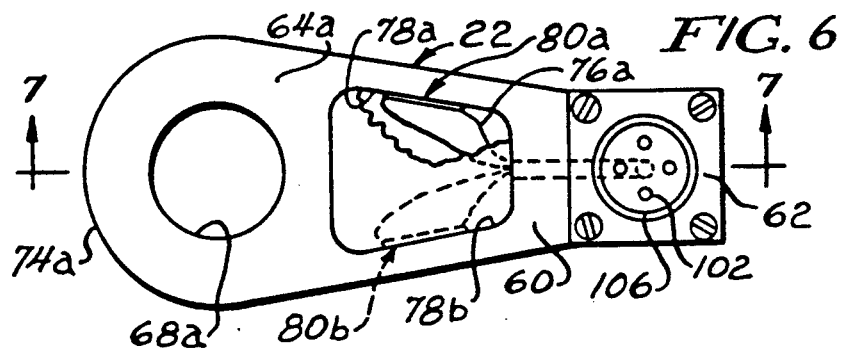
FIG. 6 is a side elevational view of the clevis load cell for measuring hand brake force in the railcar of FIG. 1.
Figure 7:
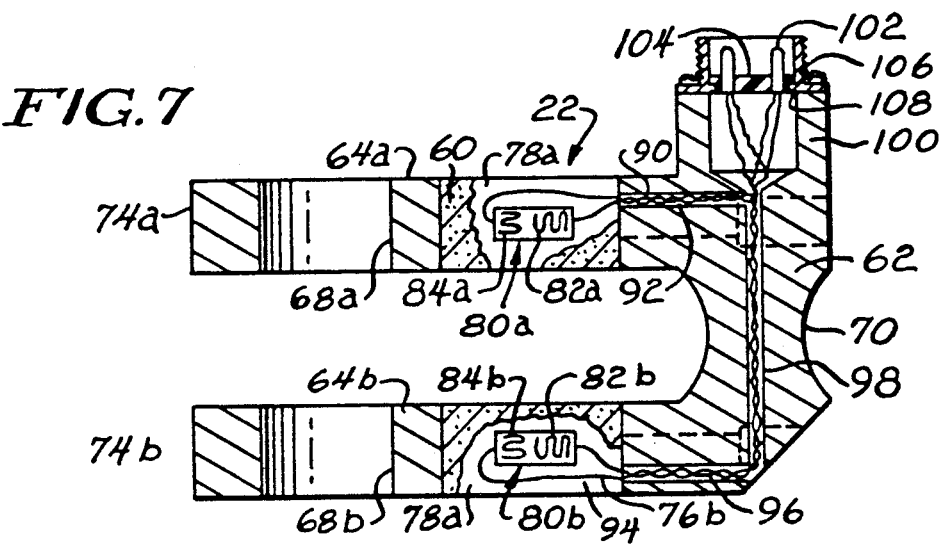
FIG. 7 is a sectional view of the clevis load cell taken along lines 7—7 of FIG. 6.

Referring to FIGS. 6 and 7 details of clevis load cell 22 are illustrated. The clevis load cell 22 includes a body 60 having a base 62 and a pair of integral spaced legs 64a and 64b forming a modified U-shaped configuration. The body 60 may also be fabricated from any suitable material, such as aluminum and the like. A pair of aligned holes 68a and 68b extend through legs 64a and 64b. A concave surface 70 is formed concentrically around base 62 at the base of legs 64a and 64b to provide a neck area for contacting the chain 16 of the railcar hand brake. As seen in FIG. 6 the widths of legs 64a and 64b progressively increase toward their ends. The legs 64a and 64b terminate with curved ends 74a and 74b adjacent holes 68a and 68b. Openings 76a and 76b, having a modified trapezoidal shape viewing FIG. 6, are provided through legs 64a and 64b to form surfaces 78a and 78b lying in planes that are skewed in relation to the centerline axis of body 60, generally the axis along which the hand brake force is applied. Strain gauges 80a and 80b are respectively bonded to skewed surfaces 78a and 78b. The openings 76a and 76b may be filled with a gel suitably retained by caps (not shown).

Strain gauge 80a includes a conventional strain gauge element 82a for measuring tension and a second strain gauge element 84a for measuring compressive forces, due to its perpendicular orientation to strain gauge element 82a. Strain gauge 80b also includes identical strain gauge elements 82b and 84b, also arranged in perpendicular relationship. The use of strain gauges 80a and 80b to detect both tensile and compressive forces enhances the output of brake tester 2. Electrical leads 90 are coupled to strain gauges 80a and extend through passage 92 in base 62. Similarly, leads 94 are coupled to strain gauges 80b and extend through passages 96 and 98 in base 62. Both leads 90 and 94 extend to a hollow housing 100 provided on base 62 and are electrically connected to a plurality of pins 102. The pins 102 are mounted on an insulated disc 104 retained by a sleeve 106, both affixed to base 62 at an open side 108 of hollow housing 100. The sleeve 106 possesses external threads to retain a socket and cable arrangement (not shown) in contact with pins 102 to direct the output of the strain gauges to an indicator circuit to be described. The strain gauge elements 82a, 82b, 84a, and 84b are wired to create a Wheatstone bridge in the same manner as the strain gauges of brake shoe load cell 20. The strain gauge elements 82a and 84a form opposite legs of the bridge as do strain gauge elements 82b and 84b.

In use, the clevis load cell 22 is affixed to brake rod 112 by clevis pin 114 (FIG. 1) extending through openings 68a and 68b. The hand brake chain 16 is extended around surface 70 on base 62 of clevis load cell 22. Upon being installed, the hand brake is operated to apply a loading on load cell 22 representative of the force level of the hand brake.

Figure 8:
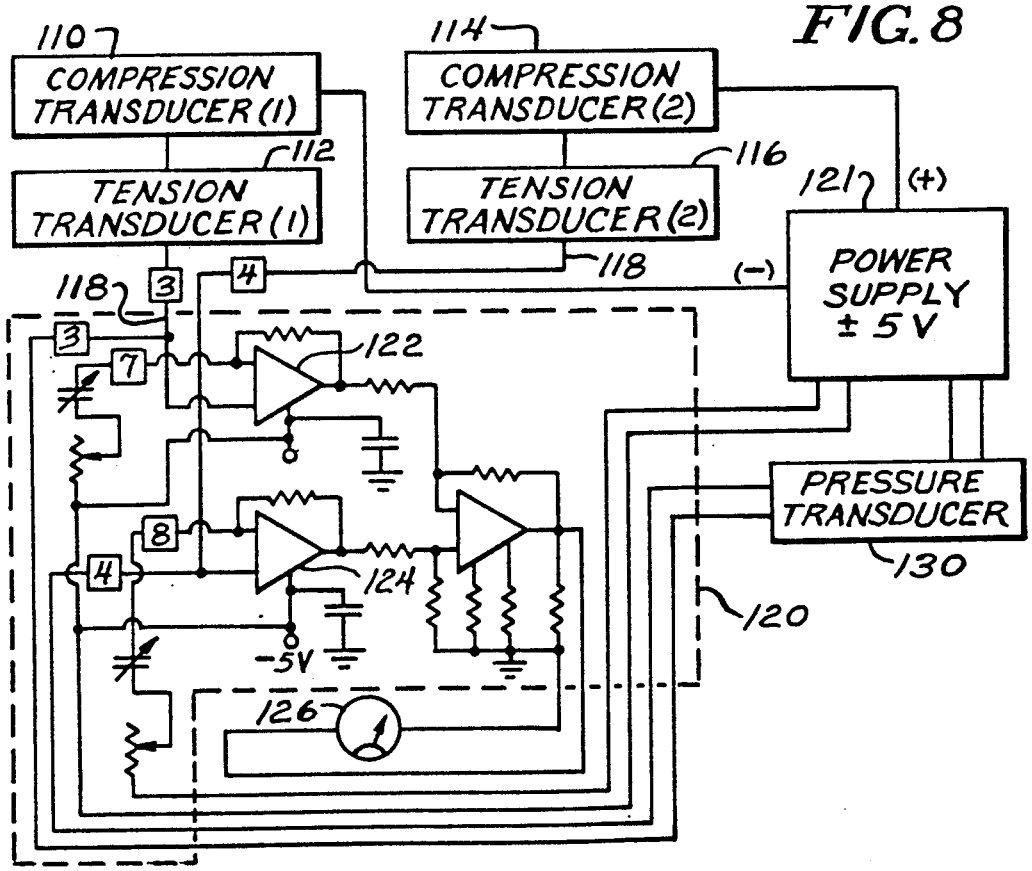
FIG. 8 is a schematic view of the electrical indicator circuit of the brake tester of the invention.

FIG. 8 illustrates the conventional indicator or readout circuit for brake tester 2 of the invention. Since both the brake shoe load cells 20 and the clevis load cell 22 are wired to form a typical Wheatstone bridge including two compression strain gauge elements and two tension strain gauge elements, the blocks 110, 112, 114, and 116 in the circuit of FIG. 8 represent the bridges formed by each of the multiple brake shoe load cells 20 or the clevis load cell 22. The imbalance of the bridge produced is applied by leads 118 to an amplifier and gains control circuit of conventional design generally represented by reference numeral 120. A suitable power supply 121 is connected to each of the strain gauge circuits and the amplifier and gain control circuit 120. The separate outputs representing force levels from the plurality of brake shoe load cells 20 and clevis load cell 22 are separately processed by a pair of differential amplifiers 122 and 124 in amplifier circuit 120 by known select switches which selectively apply one of the outputs to the input of the amplifier circuit. Appropriate calibration of the amplifier circuit is accomplished by well known gain control techniques. The output of amplifier circuit 120 is read by a digital or analog indicator or read-out unit 126 to indicate force levels. Switches (not shown) permit the indicator 116 to selectively display the force levels of the plurality of brake forces being measured.

As seen in FIG. 2 the pressure in the brake cylinder 10 is measured by pressure transducer 130 having a blade end 132 that can be inserted into the air inlet line 133 of the brake cylinder at a flange 134. The blade end has an opening (not shown) to transmit air pressure to a standard pressure transducer device 136. The pressure reading is converted to an electrical signal by the pressure transducer and is directed by leads 138 to amplifier 118. Pressure readings can selectively be indicated on indicator 122 by a select switch.

It should be apparent that the foregoing components and circuit of the brake tester are compact and lightweight. The brake tester can be transported in a carrying case which can serve as the housing for the indicator circuit and display indicators at the test site.

What is claimed is:

1. A brake tester for a railcar comprising
   brake shoe means arranged to be affixed to the brake head of a railcar for simulating the brake shoe,
   said brake shoe means including force transducer means for producing an output measuring the static force applied between said brake shoe means and a wheel of the railcar during braking,
   said brake shoe means further including means for contacting the wheel at a plurality of spaced points, and
   circuit means operatively coupled to said output of said force transducer means, said circuit means including indicator means for displaying the magnitude of the static force being measured.

2. The brake tester according to claim 1 wherein said brake shoe means undergoes deflection during measurement of said static force, said deflection being dependent on the static force being applied.

3. The brake tester according to claim 2 wherein said force transducer means includes a plurality of strain gauges affixed to said brake shoe means for measuring the static force.

4. The brake tester according to claim 3 wherein said plurality of strain gauges respectively detect compressive and tensile forces applied to said brake shoe means for measuring the static force.

5. The brake tester according to claim 1 wherein said brake shoe means includes a member having a flat intermediate central portion and a pair of flat end portions, said end portions being disposed in respective planes lying in angular relationship to said central portion.

6. The brake tester according to claim 5 wherein said means for contacting the wheel includes a foot member projecting from each of said end portions, said foot members arranged to contact the wheel of the rail car during braking.

7. The brake tester according to claim 6 wherein said force transducer means includes a plurality of strain gauges affixed to said intermediate portion of said brake shoe means.

8. The brake tester according to claim 7 wherein said plurality of strain gauges are respectively mounted on opposed surfaces of said intermediate portion, one of said opposed surfaces adapted to confront the wheel of the railcar.

9. The brake tester according to claim 1 wherein said means for contacting the wheel includes a plurality of projecting members affixed to said brake shoe means, said plurality of projecting members arranged to contact the wheel of the railcar during braking.

10. The brake tester according to claim 9 wherein said plurality of projecting members have respective end portions for conducting the wheel with point contact.

11. The brake tester according to claim 10 wherein said end portions are rounded with a constant radius.

12. The brake tester according to claim 1 further comprising clevis means arranged to be affixed to the chain of the hand brake linkage of the railcar and simulating the hand brake clevis, force transducer means affixed to said clevis means for producing an output measuring the tensile force applied to said clevis means during braking by the hand brake, said circuit means being operatively coupled to the output of said force transducer means, said indicator means selectively displaying magnitude of the hand brake force being measured.

13. The brake tester according to claim 12 wherein said clevis means includes a pair of spaced legs for operative connection to the chain of the hand brake, said force transducer means being affixed to said spaced legs.

14. The brake tester according to claim 13 wherein said brake shoe means includes a plurality of brake shoe load cells arranged to be respectively affixed to the brakehead of a plurality of wheels of the railcar, said force transducer means being a force transducer respectively affixed to said plurality of brake shoe load cells, each of said force transducers producing an output for simultaneously measuring the static force applied between said brake shoe member and a respective wheel of the railcar, said circuit means being selectively coupled to said outputs of said force transducers of said brake shoe members and said output of said force transducer means of said clevis means for simultaneous brake shoe and clevis force measurment.

15. The brake tester according to claim 1 further comprising pressure transducer means arranged to measure the air pressure in the brake system of the railcar, said pressure transducer means producing an output measuring the air pressure, said circuit means being operatively coupled to said pressure output, and said indicator means displaying the magnitude of the pressure force being measured.

16. A brake tester for a rail car comprising
    clevis means for simulating the clevis of a hand brake assembly of the railcar, said clevis means being arranged to be operatively affixed to the hand brake assembly and be subjected to the force applied by the hand brake, said clevis means having force transducer means producing an output representative of the hand brake force, and said output of said force transducer means being responsive to tension and compression forces applied to said clevis means by the hand brake force, said clevis means includes a surface means lying in a plane angularly oriented to the direction of application of the hand brake force on said clevis means, said plurality of strain gauges being affixed to said surface means.

17. The brake tester according to claim 16 wherein said force transducer means include a plurality of strain gauges.

18. A brake shoe load cell for measuring the brake shoe force in the brake system of a railcar comprising, body means having opposed surfaces, said body means having a plurality of projecting members extending from said body means for contacting a railcar wheel, each of said plurality of projecting members having a rounded free end for point contact with the railcar wheel, and strain gauge means affixed to said opposed surfaces.

19. The brake shoe load cell according to claim 18 wherein said body means includes an intermediate portion forming said opposed surfaces, said body means further including two opposed end portions integrally connected to said intermediate portion, said plurality of projecting members being affixed to said end portions and extending in the same direction.

20. The brake shoe load cell according to claim 19 wherein said opposed surfaces are flat, said end portions respectively forming flat surfaces lying in planes angularly oriented to the plane of said opposed surfaces, said plurality of projecting members being respectively affixed to said flat surfaces of said end portions.

21. A clevis load cell to measure the hand brake forces in the hand brake assembly of a railcar comprising body means having a base and a pair of legs extending from said base forming a modified U-shaped configuration, said legs having aligned openings for receiving a clevis pin of the hand brake assembly, an opening extending through each of said legs, strain gauge means affixed to each of said legs within said openings.

22. The clevis load cell according to claim 21 wherein said strain gauge means includes a pair of perpendicularly oriented strain gauge elements affixed to each of said legs.

* * * * *